United States Patent
Aminzade et al.

(10) Patent No.: US 8,463,772 B1
(45) Date of Patent: Jun. 11, 2013

(54) VARIED-IMPORTANCE PROXIMITY VALUES

(75) Inventors: Daniel M. Aminzade, New York, NY (US); Robert S. Renaud, New York, NY (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 12/779,823

(22) Filed: May 13, 2010

(51) Int. Cl.
  *G06F 17/00* (2006.01)
(52) U.S. Cl.
  USPC .......................................... 707/723
(58) Field of Classification Search
  USPC .......................................... 707/723
  See application file for complete search history.

(56) References Cited

U.S. PATENT DOCUMENTS

| | | | |
|---|---|---|---|
| 6,070,157 A | 5/2000 | Jacobson et al. | |
| 6,665,715 B1 | 12/2003 | Houri | |
| 6,701,307 B2 | 3/2004 | Himmelstein et al. | |
| 7,117,199 B2 | 10/2006 | Frank et al. | |
| 7,136,875 B2 | 11/2006 | Anderson et al. | |
| 7,525,484 B2 * | 4/2009 | Dupray et al. | 342/450 |
| 7,606,798 B2 | 10/2009 | Ge et al. | |
| 7,716,161 B2 | 5/2010 | Dean et al. | |
| 7,908,287 B1 * | 3/2011 | Katragadda | 707/767 |
| 8,086,690 B1 | 12/2011 | Heymans et al. | |
| 8,171,048 B2 | 5/2012 | Ge et al. | |
| 8,301,639 B1 * | 10/2012 | Myllymaki et al. | 707/748 |
| 2002/0002552 A1 | 1/2002 | Schultz et al. | |
| 2002/0042789 A1 | 4/2002 | Michalewicz et al. | |
| 2002/0059094 A1 | 5/2002 | Hosea et al. | |
| 2002/0138479 A1 | 9/2002 | Bates et al. | |
| 2002/0156779 A1 | 10/2002 | Elliott et al. | |
| 2003/0023489 A1 | 1/2003 | McGuire et al. | |
| 2003/0036949 A1 | 2/2003 | Kaddeche et al. | |
| 2003/0061211 A1 | 3/2003 | Shultz et al. | |
| 2003/0076805 A1 | 4/2003 | Agrawal et al. | |
| 2003/0158777 A1 | 8/2003 | Schiff et al. | |
| 2003/0187949 A1 | 10/2003 | Bhatt et al. | |
| 2003/0212519 A1 | 11/2003 | Campos et al. | |
| 2003/0217052 A1 | 11/2003 | Rubenczyk et al. | |

(Continued)

FOREIGN PATENT DOCUMENTS

WO WO0215479 A1 2/2002

OTHER PUBLICATIONS

MapQuest http://geography.about.com/od/streetroadcitymaps/a/mapquest.htm.*
Smallman, Wayne, "What Is Google Local and How Can It Help Your Business?", Web Design, Internet Marketing and Business Advice, Octane, May 6, 2010, [online]. [Retrieved on Jul. 18, 2011]. Retrieved from the Internet: < http://www.octane.uk.net/2010/05/what-is-google-local-and-how-can-it-help-your-business/>, 6 pages.
"Introducing Google Places", Official Google Blog, (Apr. 20, 2010) [online]. [Retrieved on Jul. 20, 2011]. Retrieved from the Internet: <http://googleblog.blogspot.com/2010/04/introducing-google-places.html>, 4 pages.
Olsen, Stefanie, "Google Goes Local", Cnet News (Mar. 17, 2004) [Retrieved on JUl. 19, 2011]. Retrieved from the Internet: < http://news.cnet.com/2100-1038_3-5173685.html>, 1 page.

*Primary Examiner* — Rehana Perveen
*Assistant Examiner* — Masoud S Hakami
(74) *Attorney, Agent, or Firm* — Bracewell & Guiliani, LLP

(57) ABSTRACT

Methods, systems, and apparatus, including computer programs encoded on one or more computer storage devices, for determining a distance importance factor for a search query, region or both. In one aspect, a method includes receiving a query from a client computing device and obtaining search results responsive to the query. A distance importance factor for the query is obtained that indicates the importance of proximity of a search result location to a query location. The search result location is a geographic location associated with a search result and the query location is a geographic location associated with the query. For each search result, based on the distance importance factor and on the proximity of the search result location to the query location, a proximity value is determined. The proximity values for the search results are provided to a ranking module configured to rank the search results.

24 Claims, 9 Drawing Sheets

U.S. PATENT DOCUMENTS

| | | |
|---|---|---|
| 2005/0065916 A1* | 3/2005 | Ge et al. ............................ 707/3 |
| 2005/0065959 A1 | 3/2005 | Smith et al. |
| 2007/0109320 A1* | 5/2007 | Skibak et al. ................. 345/611 |
| 2007/0115373 A1* | 5/2007 | Gallagher et al. ......... 348/231.3 |
| 2007/0143345 A1 | 6/2007 | Jones et al. |
| 2009/0031006 A1* | 1/2009 | Johnson ........................ 709/218 |
| 2009/0132469 A1* | 5/2009 | White et al. ...................... 707/2 |
| 2009/0268033 A1* | 10/2009 | Ukita ............................. 348/169 |
| 2010/0100437 A1 | 4/2010 | Dean et al. |
| 2011/0016117 A1* | 1/2011 | Edala et al. .................... 707/729 |

* cited by examiner

VARIED-IMPORTANCE PROXIMITY VALUES

TECHNICAL FIELD

This specification relates to ranking search results to present to a user of an electronic device.

BACKGROUND

The use of electronic devices with Internet connectivity has increased significantly over the past few years, as the availability and speed of wireless Internet service has improved. The increased availability of Internet connectivity has also seen a rise in the use of search engines. For example, search queries are now often entered on the fly while a user is at a location relevant to his or her particular query. Typically, search results are ranked based on the topicality of the search result (i.e., the relevance to the subject matter of the query), the quality of the search result (e.g., if the search result relates to a business that has been highly rated, the quality can be boosted) and the proximity of a location associated with the search result to a location related to the query or associated with the user. For example, if a user entered a search query for "Airport San Francisco", the search results will likely include the website for the San Francisco International Airport. However, since the San Francisco International Airport is actually quite a distance from the city center of San Francisco, the ranking of this result may be penalized based on the proximity score as compared to other search results that are relevant to "airport" and "San Francisco", e.g., an airport limousine service located in San Francisco.

SUMMARY

In general, one innovative aspect of the subject matter described in this specification can be embodied in methods that include the actions of receiving a search query from a client computing device and obtaining search results responsive to the search query. A distance importance factor associated with the search query is obtained. The distance importance factor indicates the importance of proximity of a search result location to a query location. The search result location is a geographic location associated with a search result and the query location is a geographic location associated with the search query. For each of the search results, based on the distance importance factor and on the proximity of the search result location corresponding to the particular search result to the query location, a proximity value is determined for the particular search result. The proximity values for each of the search results are provided to a ranking module that is configured to rank the search results responsive to the search query. Other embodiments of this aspect include corresponding systems, apparatus, and computer programs, configured to perform the actions of the methods, encoded on computer storage devices.

These and other embodiments can each optionally include one or more of the following features. The distance importance factor can be obtained as follows. A query can be found in a query-data store that corresponds to the received search query. The query-data store is a store of multiple queries and, for each query, a distance associated with the query that represents a typical proximity of a search result location to a query location for the particular query. The distance associated with each query comprises a scaled value between 0 and 1, and the scaled distance value can be the distance importance factor. Each query can be further associated by data in the query-data store with a region-normalized-distance that is the distance associated with the query adjusted based on a geographic region that includes the query location.

Obtaining the distance importance factor associated with the search query can include obtaining a distance importance factor associated with the query location that indicates the importance of proximity of the search result location to any search query associated with that query location. A region-data store can store data that identifies multiple geographic regions, and, for each identified geographic region, associates a distance with the geographic region that represents a typical proximity of a search result location and a query location for query locations within the geographic region. Determining the distance importance factor associated with the query location can include finding a region identified in the region-data store that corresponds to the query location, wherein the distance importance factor is based on the distance associated with the identified region.

In some implementations, the distance importance factor is determined based on a population density of a geographic region that includes the query location.

In general, another aspect of the subject matter described in this specification can be embodied in methods that include the actions of receiving data that includes multiple queries, and for each query one or more selected search results that were selected from a set of search results generated in response to the query. Based on the received data, a collection of queries and stored data that associates each query with a distance is generated. For a particular query, the distance is representative of a typical proximity of a search result location to a query location for the particular query. The search result location is a geographic location associated with a search result and the query location is a geographic location associated with the particular query.

These and other embodiments can each optionally include one or more of the following features. The system distance representative of the typical proximity for a particular query can be the mean or the median of the distances between the search result locations and the query locations for the one or more selected search results for the particular query. The distance representative of the typical proximity for a particular query can be a scaled value between 0 and 1.

The query log data further can include, for each query, one or more driving direction distances associated with the one or more selected search results for the query. A driving direction distance is a distance determined in response to receiving a driving direction request for the corresponding selected search result. Determining the distance to associate with each query can be based on the one or more driving direction distances for the particular query. The distance representative of the typical proximity for a particular query can be determined from the median or the mean of the one or more driving direction distances for the particular query.

Based on the received query log data, region data that identifies multiple geographic regions and data that associates each identified region with a distance can be generated. For a particular region, the distance is representative of a typical proximity of a search result location to a query location for query locations within the particular geographic region. Data can be generated that associates each query in the collection of queries with a region-normalized distance, which is the distance associated with the query adjusted based on a geographic region that includes the query location. The region-normalized distance for a particular query can be the distance associated with the particular query divided by the distance associated with a geographic region that includes the query location corresponding to the particular query.

Particular embodiments of the subject matter described in this specification can be implemented so as to realize one or more of the following advantages. For search queries that typically provide search results that have corresponding search result locations far away from the query location (e.g, queries for "airport", "theme park" or "ski resort"), the techniques described can provide fewer off-topic or low-quality search results, which using previous techniques were ranked highly only because of the proximity of their corresponding locations to the query location. For search queries where quality is less important because the quality of the search results is generally the same (e.g., queries for "atm", "post office" or "convenience store"), the techniques described put a greater emphasis on the proximity of the search result location to the query location, and therefore return fewer far-away search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
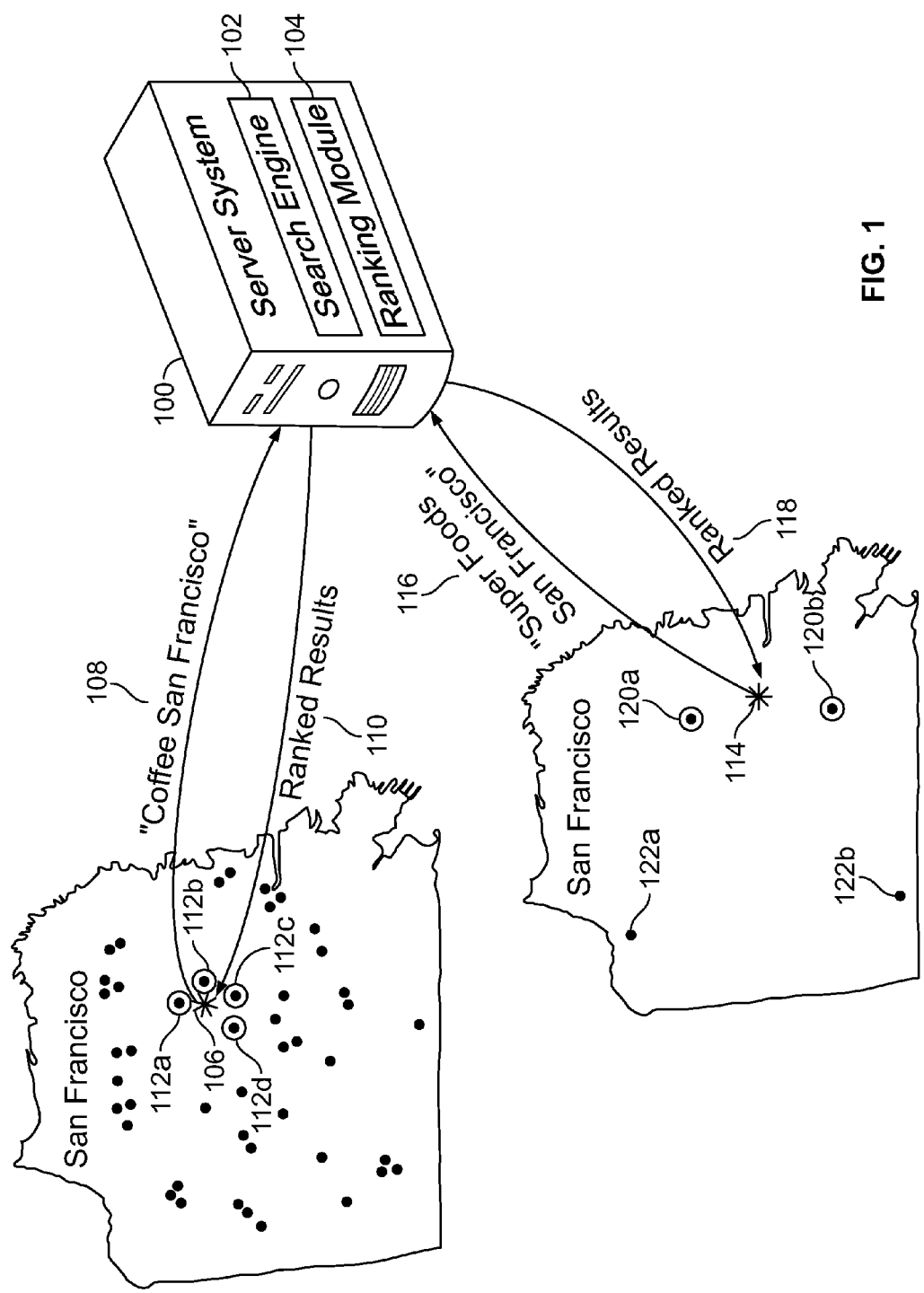
FIG. 1 is a schematic representation of a system configured to rank search results using a distance importance factor.

Systems and techniques will be described that rank search results using a distance importance factor. A distance importance factor can indicate a level of importance of proximity of a search result location to a query location. A query location typically represents a geographic location associated with a particular search query. For example, a search query "Coffee San Francisco" has a query location of San Francisco, which can be extracted from the search query itself in this example. A search result location is a geographic location associated with a search result. For example, a search result to the "Coffee San Francisco" search query can be a coffee shop located on Market Street in San Francisco, in which case the Market Street address is the search result location. The proximity between the query location and the search result location can be a factor in scoring search results, where the results are ranked based on their scores. However, depending on the nature of the search query, proximity may be more or less important when scoring the search results. As is described in further detail below, a distance importance factor can indicate the level of importance of proximity for a particular search query, for a particular query location or for a combination of the search query and the query location.

The distance importance factor can, for example, be applied to boost or penalize particular search result rankings based on a distance or proximity to a search result location from a query location. The query location is preferably a location that is related to the subject matter of the query. Techniques for determining the query location are described below. Depending on the nature of the search query (e.g., the subject matter), the proximity of a location associated with a search result (i.e., search result location) to the query location may be of varied importance. For example, if the user is searching for an automated teller machine (ATM) near the user's present location (which can be the query location), the user may find the proximity to the ATM important. The distance may be important to this user because typically any ATM can allow access to the service of interest, so a closer ATM provides the advantage of saving the user travel time. Therefore, providing search results for ATMs 30 miles away may not be preferable to this particular user if, for example, one or more ATMs are available within blocks of the user's present query location. That is, proximity is important for this topic of search query.

By contrast, in another example, if a user enters a search query for an attorney, the proximity of the attorney's office to the query location may be of less importance to the user. Instead, the reputation, rating, or type of law may be of more importance than the distance to the search result location. Accordingly, the distance importance factor can reflect that proximity to search result location is less important, such that the scoring algorithm does not penalize (or over-penalize) any particular search result venue simply because the venue is farther away than another venue.

In yet another example, a user can enter a search query for an airport near the user's location. In this example, the distance to the search result location (e.g., the airport venue) may be of even less importance because the user will generally be more tolerant of traveling to the airport as very few airports typically exist within any particular city. In this example, the user may wish to view search results for each available airport within a radius of the user's location, but may not wish to view search results for other businesses or venues simply having the term "airport" in the name of the business. Accordingly, the distance importance factor can be determined such that the proximity does not penalize particular search result locations, so that the actual airports will be provided and ranking highly in a listing of search results. Thus, in the above examples, the distance importance factor may be configured high when searching for services, such as an ATM; configured medium when searching for businesses, such as a law firm; and configured low when searching for venues such as an airport. In some implementations, determining distance importance factors can be based on a learned model trained using a historical log of queries and click data, although other techniques are also described.

Techniques and systems are described here that determine estimates of the extent to which users are concerned about the geographic proximity of search results by analyzing data including, but not limited to search query data, log data, driving directions data, and population data. The estimates can be a function of a particular query location and a search result location. The estimates can also be a function of driving direction distances to selected search results. The systems can store data for particular search queries and apply the data to determine distance importance factors, which eventually can influence the provision and ranking of search results. The distance importance factors can be applied at query time to enable search engines to provide better-ranked search results to users.

FIG. 1 is a schematic representation of a system configured to rank search results using a distance importance factor. The system includes a server system 100 that can receive search queries and respond with ranked search results. The server system 100 is capable of communicating with multiple users submitting search queries over a network (e.g., the Internet). For simplicity, the server system 100 is shown as a single computer but can be implemented across multiple computers located in one or more physical locations. The server system 100 includes a search engine 102 and a ranking module 104. In response to a search query, the server system 100 can employ the search engine 102 to search one or more bodies of information for the received search query. The server system 100 can employ the ranking module 104 to rank the search results. The server system 100 can provide the ranked search results to a user's computing system or other electronic device.

The ranking module 104 is configured to rank search results according to a number of factors. The ranking module 104 is configured to rank results based on proximity in addition to one or more other factors, for example, topic relevance and quality of the search results. However, the ranking module 104 applies a distance importance factor that can increase or decrease the weighting of proximity in a scoring calculation. By way of illustrative example, a query location 106 is depicted in FIG. 1 in the city of San Francisco. In this example, the user is at the query location 106 and submits a search query 108 for "Coffee San Francisco" to the server system 100. A number of location markers are shown surrounding the query location 106, depicted in the figure as dots. These location markers correspond to the search result locations for a number of potential search results, i.e., each search result location corresponds to a potential search result that relates to coffee in San Francisco, and that may be presented to the user if selected by the server system 100. The relatively high number of dots provides a visual indication of the relatively high density of potential search result locations for this type of query.

The ranking module 104 can assign a score to each possible search result to determine in which order the search results should be presented to a user, i.e., the ranking. The scores can be based on a number of factors, including the proximity of a particular search result location to a particular query location and the distance importance factor for a particular query. The ranking module 104 can use the scores to rank the search results according to selected factors. The server system 100 can send the ranked search results 110 to the user at location 106. In this example, the circled dots 112a-d represent top ranked search results. As is visually apparent from the figure, the top ranked search results correspond to the search result locations in closest proximity to the query location 106, because in this example, the distance importance factor indicated that proximity was of relatively high importance.

By comparison, a user can submits a search query 116 for "Super Foods San Francisco" to the server system 100, where the query has a corresponding query location 114. In this instance, the user is presumably looking for search results relating to the (fictitious) grocery chain "Super Foods". The location markers 120a-122b represent four potential search result locations. As is visually apparent, the density of Super Foods locations is considerably less than the density of coffee venues in the city of San Francisco. In this example, the distance importance factor associated with this search query indicates that proximity is of less importance than in the previous example. That is, the lower distance importance factor can indicate a higher tolerance for a longer driving or walking distance when looking for a food store than in the above "coffee" search query example, since a user will likely drive to any or all four Super Foods location to obtain an item.

A number of location markers 120a-b and 122a-b are shown surrounding location 114. Each location marker 120a-122b represents a "Super Foods" search result location. The server system 100 can assess each search result location and provide ranked results 118 to the requesting user. As shown in FIG. 1, the closest search result locations are locations 120a and 120b. However, since the only four locations of Super Foods are depicted, it is likely that all four results 120a-122b will be provided in a search result list, although the search results corresponding to locations 120a and 120b will be the highest ranked.

Figure 2:
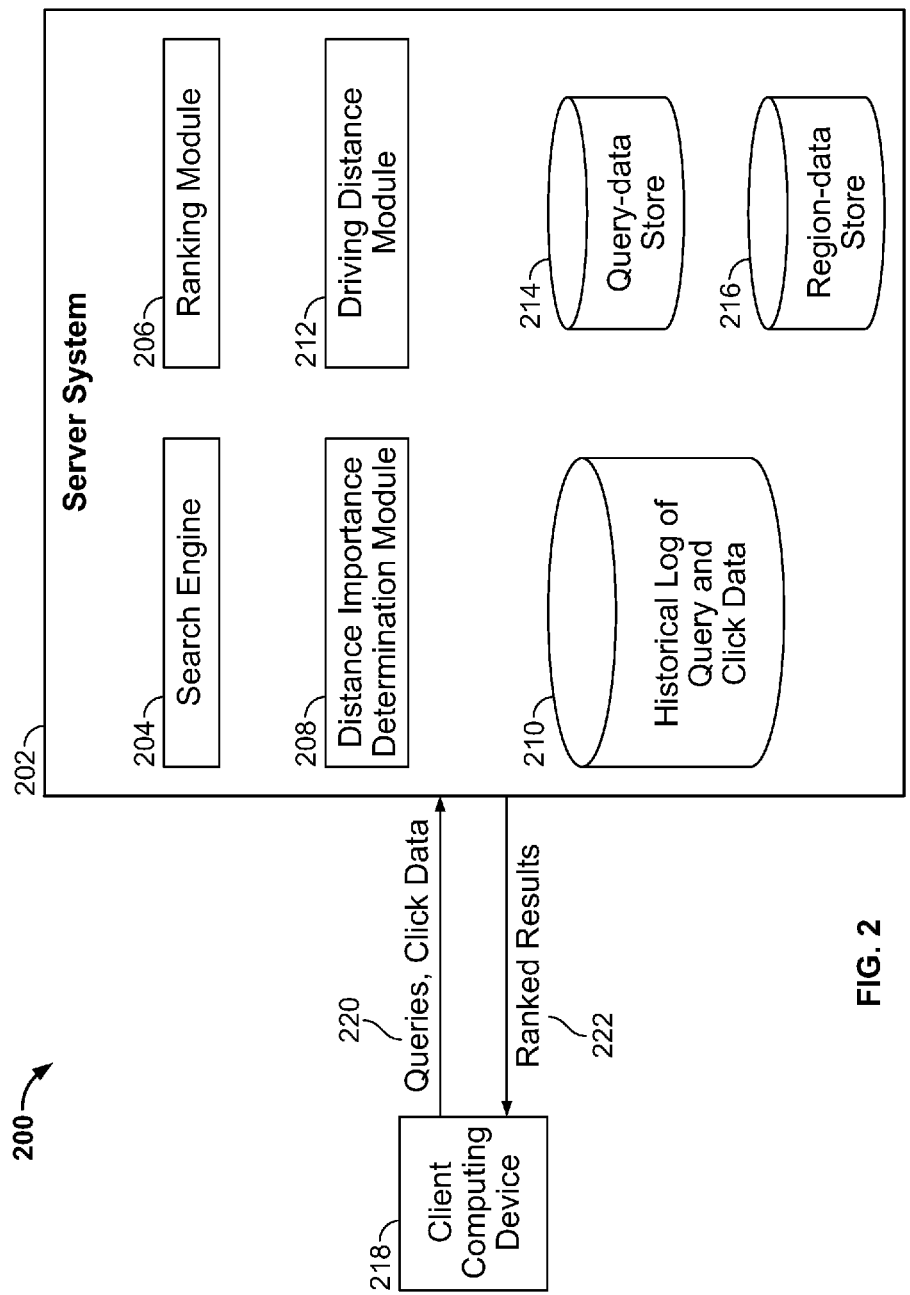
FIG. 2 is a schematic representation of an example system for determining ranked search results based on a distance importance factor.

FIG. 2 is a schematic representation of an example system 200 for determining ranked search results based on a distance importance factor. The system 200 includes a server system 202 that is configured to communicate with multiple users over one or more networks (not shown). The server system 202 can be the server system 100 of FIG. 1. The server system 202 for simplicity is shown as a single computer, but can be implemented across multiple computers located in one or more physical locations. The various components included in the server system 202 will be described below in reference to various implementations of determining distance importance factors.

The server system 202 includes a search engine 204 and a ranking module 206. The search engine 204 and ranking module 206 can be respectively, engine 102 and module 104 of FIG. 1. The search engine 204 generally performs search queries to identify relevant content items (e.g., Internet-addressable resources) based on the search terms or phrases in the query and/or a number of other factors. The search engine 204 can employ ranking module 206 to rank content items for presentation to the user.

The server system 202 also includes a distance importance determination module 208. The distance importance determination module 208 is configured to determine distance importance factors, which can be associated with a query or a region. The server system 202 also includes a driving distance module 212. The driving distance module 212 is configured to analyze user requests for driving directions. The server system 202 includes one or more data storage devices coupled to the one or more computers. For example, the server system 202 includes the historical log of query and click data store 210, a query-data store 214, and a region-data store 216. The different stores can be the same or different data storage devices. Other collections of historical data can also be stored. The query-data store 214 stores a collection of query-distance pairs, where each query stored in query-data store 214 is associated with a distance that represents a typical proximity of a search result location to a query location for the particular query. The region-data store 216 stores a collection of geographic region-distance pairs, where each geographic region stored in data store 216 is associated with a distance that represents a typical proximity of a search result location to a query location for query locations within the particular geographical region.

The data in stores 210, 214, and 216 can be generated by the system 200. For example, the data in each of data stores 210, 214, and 216 can be generated by collecting and analyzing search query data and corresponding selected search results over a time period and can be continually or periodically added to and/or updated.

In operation, a client computing device 218 receives a search query from a user and submits it to the server system 202. The server system 202 receives the search query from the client computing device 218 and performs a search to obtain search results responsive to the received search query. The server system 202 can employ search engine 204, ranking module 206, distance importance determination module 208, and driving distance module 212 to determine a set of ranked search results 222 to send back to the client computing device 218. If the user of the client computing device 218 selects one or more of the search results, i.e., "clicks on a result", the corresponding "click data" can be received by the system 202. That is, the system can receive click data that indicates which search results were clicked on by the user of the client computing device 218. The click data can be used to determine distance importance factors, as is described further below.

Figure 3:
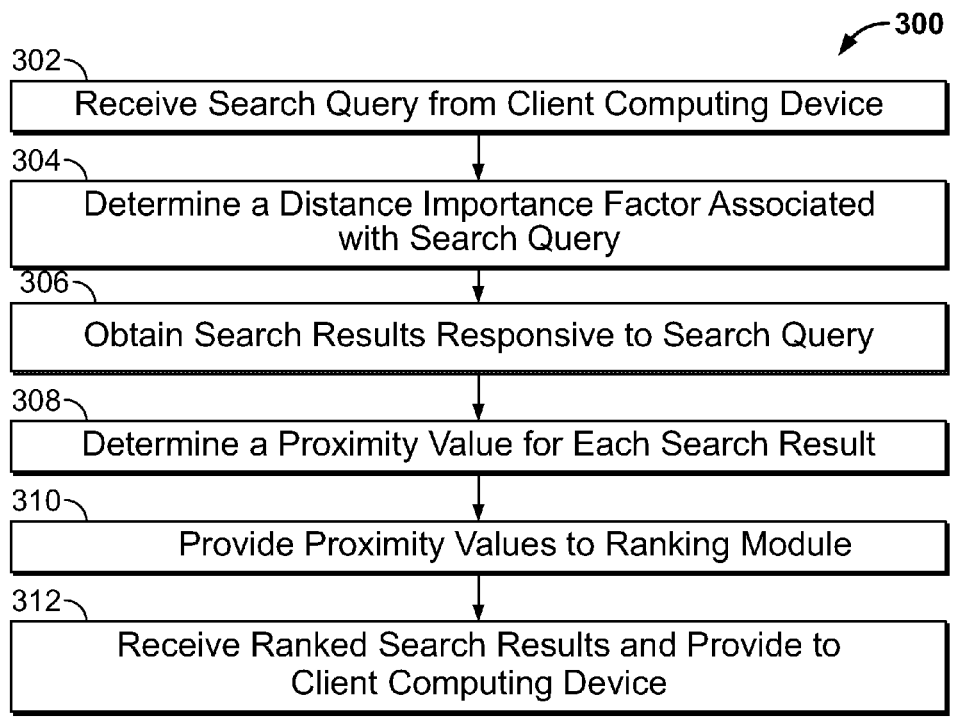
FIG. 3 is a flowchart showing an example process for ranking search results based on a distance importance factor.

FIG. 3 is a flowchart showing an example process 300 for ranking search results based on a distance importance factor. For illustrative purposes, the process 300 will be described in reference to the system 200 shown in FIG. 2, although it should be understood that differently configured systems can be used to implement the process 300.

A search query is received from a client computing device (Step 302). For example, the search query can be received from a user operating client computing device 218.

A distance importance factor associated with the search query is determined (Step 304). How the distance importance factor is determined is described in detail below with reference to FIGS. 4-7C. The distance importance factor indicates the importance of proximity of a search result location to a query location for the particular search query. However, in some implementations, if a distance importance factor for the particular search query is not available, a distance importance factor for the query location (i.e., the location that corresponds to the search query) can be used instead, which is also described further below.

A search corresponding to the search query can be performed in search engine 204, for example, and search results responsive to the search query are obtained (Step 306). A proximity value for each search result can be determined based on the distance importance factor determined for the search query and the proximity of the search result location corresponding to the search results to the query location (Step 308). The proximity values can be provided to a ranking module, e.g., ranking module 206 (Step 310). The ranking module can determine a score for each search result that can be based on multiple factors, e.g., relevancy of a search result to the search query or the quality of a search result. In some implementations, scoring search results can include using past user behavior from search logs and/or summary information derived from click logs or other collectable data. However, the scoring is also based on the proximity value for the search result, that is, the score is based on the proximity of a location associated with the search result (i.e., the search result location) to the query location and the distance importance factor determined above (e.g., Step 304). That is, if the distance importance factor indicates that proximity is of high importance, then the proximity value (and accordingly the score) reflects the high importance attributed to proximity. Conversely, if the distance importance factor indicates that proximity is of low importance, the proximity value (and accordingly the score) will similarly reflect the lower importance.

To determine proximity can require knowing the search result location and the query location. The query location is preferably a location that is related to the subject matter of the query. For example, if the query is for EMPIRE STATE BUILDING, then the query location can be the location of the Empire State Building in New York City, e.g., expressed as the geographical coordinates of the building itself. Depending on the level of granularity desired for the query location, the location can be the city where the building is located, e.g., New York City. In some implementations, more than one query location relating to more than one level of granularity can be determined and associated with the query, e.g., a first query location can be the geographical coordinates of the building itself, while a second query location associated with this query can be geographical coordinates for New York City (which can be the coordinates for the approximate center of the city, or can be coordinates defining city boundaries).

Various techniques can be used for determining a query location that is related to the subject matter of the query and a search result location that is related to the content of the search result. In some implementations, each term included in the query can be checked against a collection of terms predetermined to identify locations and if a match is found, then the matching term(s) from the collection of location terms can be identified as the query location. For example, the location of San Francisco can be extracted from a query for RESTAURANTS SAN FRANCISCO. In some implementations, the collection of terms is a database of location terms that can include administrative areas (e.g., streets, cities, districts, states, provinces, countries) and points of interest, e.g., geographical features (e.g., mountains, rivers, lakes), landmarks (e.g., important buildings, monuments) and venues (e.g., parks, stadiums, stores). Each location can have a corresponding latitude and longitude and may also have a shape or extent. Other techniques for determining a location that is related to the query can be used. For example, if the query is entered into a search field in a map application, the user's interaction with a map displayed by the map application can be used to determine a location relating to the query. By way of illustration, if a map of the United Kingdom was displayed to the user, and the user zoomed in on the map to London and then enters a search query COFFEE SHOPS, then the query location can be determined to be London, even though London was not a term in the query. In some instances, the user can input the query location either by virtue of some related action, e.g., inputting an address in a "to" field when searching for driving directions, or in response to a prompt, or otherwise.

In some implementations, for example, queries from which a location cannot be extracted or otherwise determined that is related to the subject matter of the query, the location of the user at the time he or she submitted the query can be used instead, if known. For example, if the user is using a mobile electronic device, then the geographical location of the mobile electronic device can be determined using various techniques, some of which include using a global positioning system (GPS) information from the mobile device, cellular telephone cell tower triangulation techniques, sending a request for the location to a location service (e.g., Skyhook Wireless of Boston, Mass.), retrieving the information from the mobile electronic device's network, or receiving a manual input from the user. As another example, if the user is using a WiFi-enabled device, the location of the device may be determined using known WiFi access points and their known geographic locations. If the user is using a computer, the user's geographical location can be determined using information from the user's network provider, for example, using the user's IP address (e.g., using a service provided by IP2Location.com of Penang, Malaysia). As yet another example, a user can specify a default location that can be associated with an account for the user, which can be stored, e.g., in a cookie, for future search queries entered by the user.

The default location can also be inferred from past queries of the user, for example, if the user has made many queries in the past with San Francisco as the query location, then San Francisco can be used as the user's default location for queries where a query location cannot otherwise be determined, e.g, extracted from the query terms.

The search result location can be determined in any convenient manner. In some implementations, the search result location is extracted from a webpage or other electronic document identified by the search result. In implementations where search results are provided in a mapping application, the search result locations are known and can be obtained and used. In implementations where search results are generally business listings and points of interest, the search result locations are generally known. For example, the search result venues can be provided by yellow page providers, business owners and/or from crawling a web page that describes a business or point of interest, and the search result locations are therefore provided or determined from the source of the search result venue.

Referring again to the scoring step, other factors can be used and any or all of the factors can be combined to score a particular set of search results. The search results are ranked based on the scoring. The ranked search results are received, e.g., from the ranking module 206, and are provided to the client computing device (Step 312). The ranking module 206 can use any form of algorithm or algorithms to score and rank the search results. Other factors can be considered by the ranking module 206 in addition to the proximity value. In one implementation, the proximity value is the distance importance factor multiplied by the proximity distance. However, the proximity value can be determined according to a different relationship between the distance importance factor and the proximity.

Figure 4:
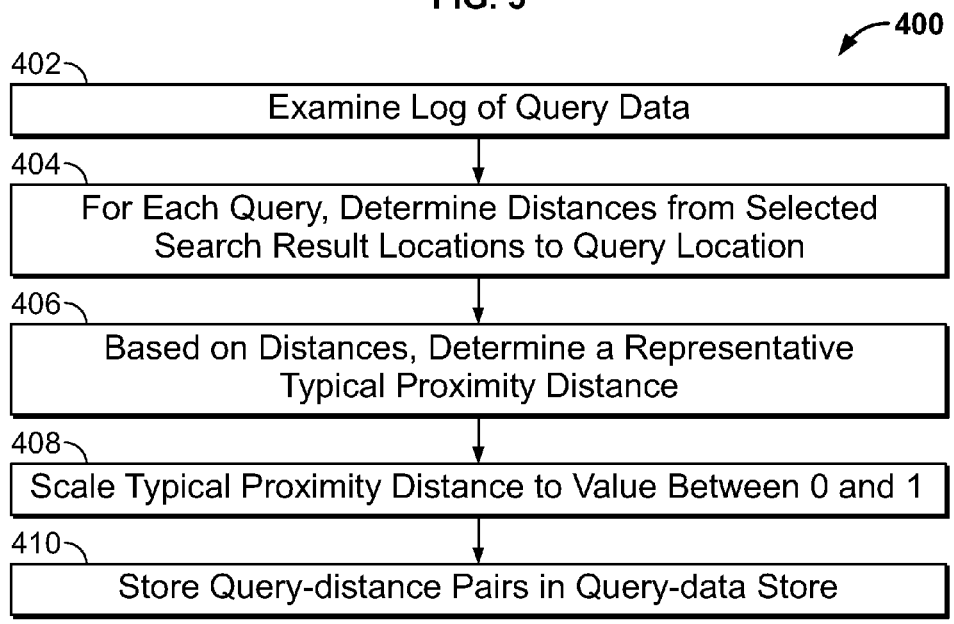
FIG. 4 is a flowchart showing an example process for determining query-distance pairs.

FIG. 4 is a flowchart showing an example process 400 for determining query-distance pairs. For illustrative purposes, the process 400 will be described in reference to the system 200 shown in FIG. 2, although it should be understood that differently configured systems can be used to implement the process 400. The process 400 can begin with examining one or more query data logs (Step 402). The query data logs can, for example, include historical logs of queries and click data such as those stored in the historical log of query and click store 210.

For a query included in the historical log 210, the distances from locations corresponding to selected (i.e., clicked) search results for the query to a query location associated with the query can be determined (Step 404). For example, consider a user who inputs the query "hotel market street san francisco" and selects three search results that correspond to three hotels and therefore three search result locations. In this example, the click data can be used to determine that (i) a first hotel selected was 1.0 mile away from the query location (i.e., Market Street San Francisco) (ii) a second hotel selected was 2.3 miles away, and (iii) a third hotel selected was 3.0 miles away. Based on this data, a representative typical proximity distance from the query location to a search result location is determined (Step 406). In some implementations, the representative typical proximity distance is the average (mean) distance between the search result locations and the query location. In other implementations, the representative typical proximity distance is the median distance. Other techniques can be used to determine the representative typical proximity distance.

The above example used "click data" as a basis for determining the representative typical proximity distance. In other implementations, previously calculated driving distances that were calculated in response to requests for driving directions from a query location to a search result location can be used instead of (or in addition to) the click data. These distances can be determined and/or recorded by the distance driving module 212. For example, if a user clicked on search result generated in response to a query, and then made a request for driving directions to a location associated with the clicked search result from a location, the "from location" can be considered the query location and the "to location" can be the search result location. The driving distance calculated in response to the request can be stored as a proximity distance for the particular query. Multiple of these distances can be accumulated over time for the query and then used as a basis for determining a representative typical proximity distance (i.e., Step 406), for example, by using the median or mean of the accumulated distances.

The distance between search result locations and query locations can vary widely depending on whether a selected search result venue is in an urban or rural area. In addition, the distance may simply vary between users entering the same query based on a high tolerance to travel far away for a particular venue (e.g., Disneyworld). A representative typical proximity distance is determined based on the distances calculated in step 404 (Step 406). The representative typical proximity distance can be determined by taking the median distance of one or more driving direction distances for a particular query. In some implementations, the typical proximity distance can be determined for each entered search query by taking the median of distances between the search result locations and the query locations for one or more selected search results. The median calculation can provide an indication of a tolerance level of how far a user is willing to travel to visit each particular location associated with a search result.

The typical proximity distance is scaled to a value between zero and 1.0 (Step 408). The typical proximity distance may pertain to any or all of (i) a typical result distance associated with each query topic, (ii) a typical result distance associated with each query location, (iii) a typical driving distance associated with each query topic, or (iv) a typical driving distance associated with each query location. The typical proximity distance can be determined from the mean or median of one or more driving direction distances for a particular query. In some implementations, the typical proximity distance for a particular query can be the mean or median of the respective distances between search result locations and query locations for one or more selected search results.

One example of scaling may include normalizing a distance for a particular search query. In some implementations, the Normalized distance (ND) can be determined using the following equation:

$$ND = \frac{[\text{Distance of Result} - \text{Distance of Closes Result}]}{[\text{Distance of Farthest Result} - \text{Distance of Closest Result}]}$$

A collection of query-distance pairs can thereby be built where each query is associated with its representative typical proximity distance, which may or may not be scaled or normalized, and stored in a data store (Step 410). The query-distance pairs can be stored in the query-data store 214, for example. The query-distance pairs can be accessed to determine the importance of proximity distance for a search query. For example, upon receiving a search query, the system 202 can find and retrieve a query-distance pair in the query-data store 214 that corresponds to the received search query. The retrieved pair includes the representative typical proximity distance (which may or may not be scaled or normalized), which can be used to determine a distance importance factor for the query, or in some implementations, is the distance importance factor. The distance importance factor can be used when scoring and ranking search results, e.g., in steps 308 and 310 of process 300. In some implementations, further calculations can be performed on retrieved data to determine a distance importance factor, for example, as described below.

In some implementations, where queries received from a user of a mobile electronic device can be distinguished from queries received from a user of a non-mobile electronic device, two collections of query-distance pairs can be built, or alternatively, each query can be associated with two distances. One query-distance pair can provide a typical proximity distance for a query received from a mobile user, while the other query-distance pair can provide a typical proximity distance for a query received from a non-mobile user. That is, a user that enters a search query into a mobile electronic device may generally be more interested in search results that correspond to search result locations closer to the query location, particularly if the query location is the physical location of the user, than a user of a non-mobile electronic device. In such implementations, a first distance importance factor can be determined and used when determining a proximity value to provide to a ranking module for a search query received from a mobile user and a different, second distance importance factor can be determined and used when determining a proximity value to provide to the ranking module for a search query received from a non-mobile user. In some implementations, query data logs that include information logged from mobile queries can be used as a basis to determine the first distance importance factor and query data logs that include information logged from non-mobile queries can be used as a basis to determine the second distance importance factor.

Figure 5:
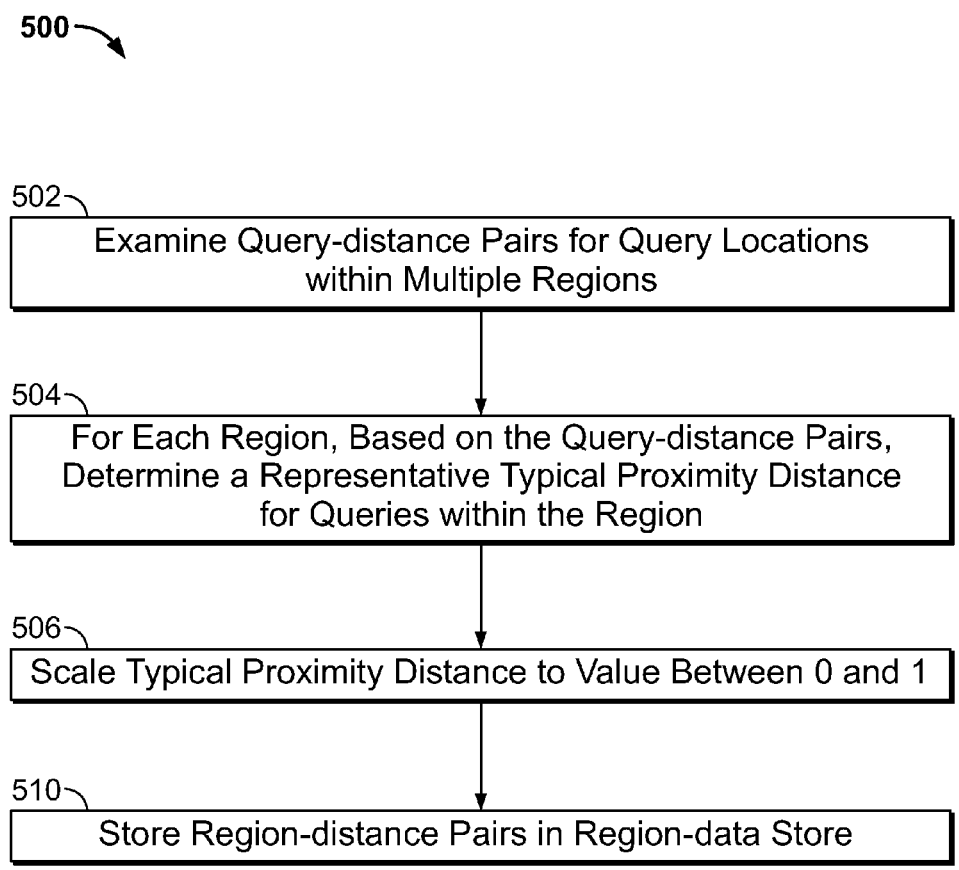
FIG. 5 is a flowchart showing an example process for determining region-distance pairs.

FIG. 5 is a flowchart showing an example process 500 for determining region-distance pairs, where the distance in a particular region-distance pair is a representative typical proximity distance for query locations that are within the region in the pair. For illustrative purposes, the process 500 will be described in reference to the system 200 shown in FIG. 2, although it should be understood that differently configured systems can be used to implement the process 500. In more densely populated areas, users may not expect to drive as far as users in sparsely populated areas. Thus, users in more densely populated regions may benefit from having proximity configured as more important when ranking search results. That is, users are typically interested in search results relatively close to the query location.

Query-distance pairs for query locations within multiple regions are examined (Step 502). Based on the examination, the server system 202 can generate a collection of geographic regions where each region associated with a distance that is a representative typical proximity distance between search result locations and query locations for queries having locations within the particular region (Step 504).

For example, the server system 202 can use query-distance pairs within a region to compute a region-normalized distance. The region-normalized distance represents the distance associated with a query adjusted based on a geographic region that includes the query location. Each query in a collection of queries (e.g., query-distance pairs) can be associated with a region-normalized distance.

In an illustrative example, the system 202 can examine query-distance pairs in the query-data store 214. The system 202 can organize geographic locations into a number of discrete location cells (i.e., regions) of increasing size. A typical proximity distance can be computed for each location cell (i.e., region) based on distances that correspond to queries associated with query locations within the location cell. A cell without sufficient data points can be filtered out. In this manner, for each of a number of geographic regions, a typical proximity distance for a region can be determined that is query-independent. Generally, for sparsely populated areas, the distance should be greater than for densely populated areas.

In some implementations, the representative typical proximity distance can be scaled, e.g., between 0 and 1 or 0.5 and 2 (Step 506). In one example, the distance importance factor scales to values near one for most regions; values greater than one for dense regions; and values less than one for sparse regions.

The region-distance pairs can be stored in a region-data store (Step 508). For example, the region-distance pairs can be stored in the region-data store 216 shown in server system 202 of FIG. 2. In some implementations, the region data and the query data can be stored two independent tables and combined at query time. For example, the region data can be stored in the region-data store 216 and the query data can be stored in the query-data store 214. Storing the data separately can provide the advantage of saving storage space since information about each query is not required to be stored for every region.

The distance stored in the region-distance pair can be used to calculate a distance importance factor for the region. In other implementations, the distance (e.g., scaled or normalized) can be used itself as the distance importance factor. If a query does not have a distance importance factor of its own available, or one cannot be determined, then as a proxy the distance importance factor that corresponds to the region that includes the query location can be used as the distance importance factor.

In some implementations, the distance calculated as a representative typical proximity distance for a particular query can be adjusted based on the typical proximity distance for the region that includes the corresponding query location. That is, a "region-normalized" typical proximity distance can be calculated.

Figure 6:
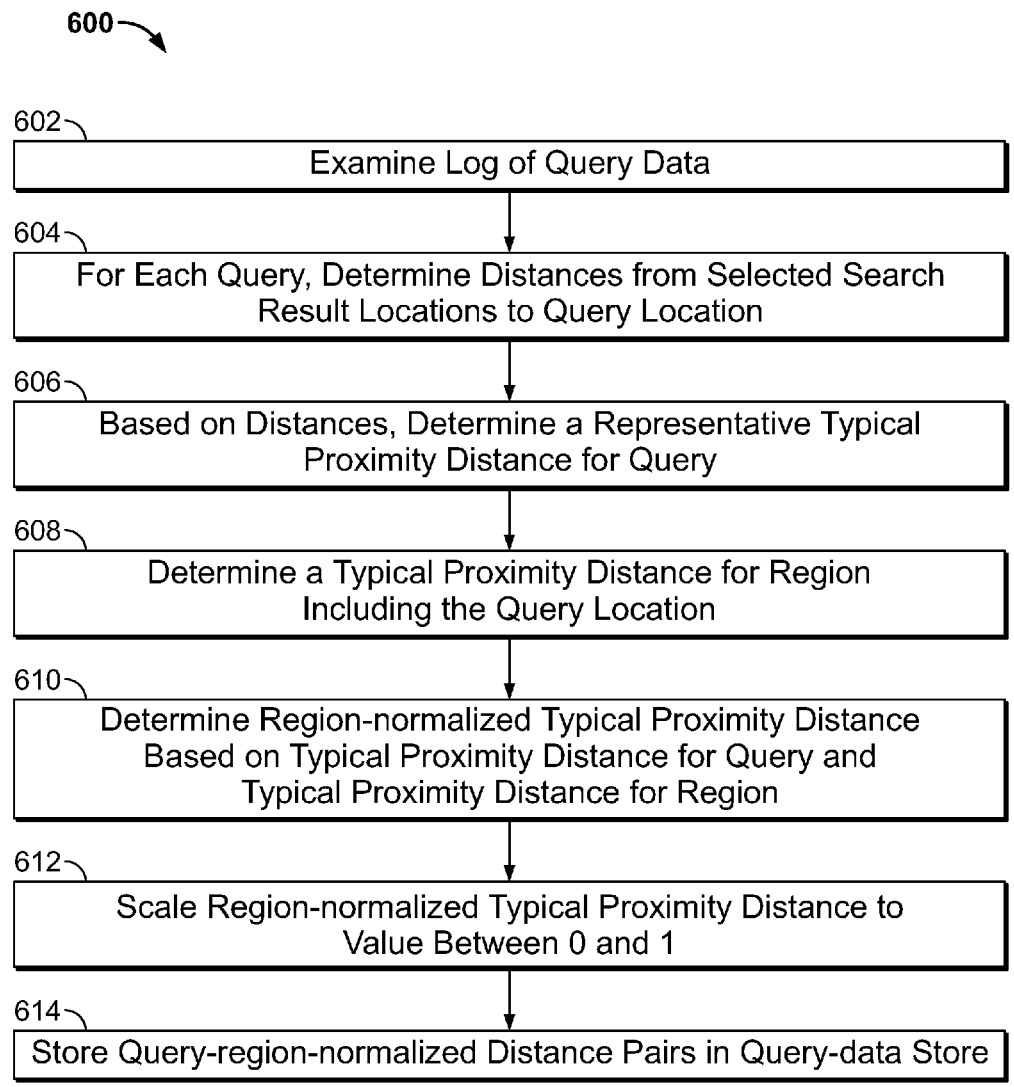
FIG. 6 is a flowchart showing an example process for determining a region-normalized distance.

FIG. 6 is a flowchart showing an example process 600 for determining a region-normalized distance. For illustrative purposes, the process 600 will be described in reference to the system 200 shown in FIG. 2, although it should be understood that differently configured systems can be used to implement the process 600. The process 600 can begin with examining one or more query data logs (Step 602). The query data logs can, for example, include historical logs of queries and click data such as those stored in the historical log of query and click store 210. For a query included in the historical log 210, the distances from locations corresponding to selected (i.e., clicked) search results for the query to a query location associated with the query can be determined (Step 604).

In general, the system 202 can use query data to compute a region normalized distance by loading summary information by location cell and query into the ranking module 206. The system 202 can find a region in the region-data store 216 that corresponds to the query location. Each query can be associated with a region-normalized distance that includes the distance associated with the query adjusted based on a geographic region that includes the query location.

Distances from selected search result locations to a query location are determined for each query (Step 604). The server system 202 can for example, determine distances by comparing the query location to the search result locations. Distances can be determined using one or more of query data, click data, or driving distance data. Multiple of these distances can be accumulated over time for the query and then used as a basis for determining a representative typical proximity distance (i.e., Step 606), for example, by using the median or mean of the accumulated distances. Steps 602 to 606 can be performed in a similar manner to steps 402-406 described above in reference to FIG. 4.

For each query, the query data log can further be examined to determine a typical proximity distance for a region that includes the query location (Step 608). This step can be performed in a similar manner to the steps 502 and 504 described above in reference to FIG. 5.

Once the typical proximity distance for the query and the region that includes the query location is known, a typical region-normalized proximity distance for the query can be determined (Step 610). In some implementations, the region-normalized distance for a particular query is the distance associated with the query divided by the distance associated with the region that includes the query location corresponding to the particular query.

The region-normalized typical proximity distance can be scaled, e.g., to a value between zero and 1.0 or between zero and 2.0 (Step 612). In some implementations, the scaled distance value can be used as the distance importance factor for the query. In other implementations, the scaled distance value, or the unscaled region-normalized distance, can be used to determine the distance importance factor.

The query-region-normalized distance pairs are stored in a query-data store (Step 614). For example, the server system 202 can store the query-region-normalized distance pairs in the query-data store 214. The query-region-normalized distance pairs can be accessed by the system 202 when ranking future search results.

The system 202 can employ one or more thresholds from the region normalized distance to compute a query distance factor between [0, 0.5]. The query distance factor can be boosted or penalized by the region normalized distance depending on the query distance factor. If the region normalized distance penalty is calculated to be greater than a lower threshold, (e.g., 0.8), the query distance factor can linearly increases until it reaches (0.5) at an upper threshold (e.g., 1.8). Queries with a very high region normalized score (e.g., capped to 0.5), the system 202 can linearly remap an output distance penalty function where the domain for the distance penalty function is [0, 1] to [0.5, 1]. Remapping the output of the distance penalty function may have the effect of compressing the range of the distance penalty function. This effect can allow other ranking factors (e.g., topicality, prominence) to have more influence over the ranking. In particular, the remapping can enable very topical or prominent far away results to outrank less topical or prominent nearby results.

As noted above, the distance importance factor can be used to boost or decrease the impact of the proximity score when scoring a search result responsive to a search query. In some implementations, the proximity score, which is sometimes referred to as a "distance multiplier", is calculated according to the following formula:

Distance multiplier=$\alpha/(\alpha+\text{distance})$ where "distance" refers to the distance between the particular search result location and query location.

In a system that does not use a distance importance factor to affect a proximity score, a is a constant that is empirically determined, and in one particular example is the value 200. In the systems described in this specification, where a distance importance factor is used, in some implementations the distance importance factor is used to modify the value of $\alpha$. In one example, the value of $\alpha$=(a constant)×(distance importance factor). In a particular example, the constant is 200, and therefore the value of $\alpha$=200×(distance importance factor). Therefore, the more important proximity is to a query, the higher the value of $\alpha$. The higher the value of $\alpha$, the higher the value of the distance multiplier.

In other implementations, the relationship between a distance importance factor and a region distance multiplier can be determined as expressed below, where the region distance multiplier is for a region and is query independent:

Distance Importance Factor=1/Region Distance Multiplier

In one implementation, a region distance multiplier is determined according to the formula below, and capped between the values of 0.5 and 2.0. In this example, the region distance multiplier is calculated based on driving distances between query locations and search result locations. A worldwide baseline driving distance is determined, which can be determined in various ways and in one example is the worldwide average driving distance.

$$RDM = \frac{(1 + CF * \text{Worldwide Baseline Distance}/\text{Typical Proximity Distance})}{(1 + CF)}$$

Where,
RDM=Region Distance Multiplier
CF=combining factor
Typical Proximity Distance=Typical proximity distance calculated for the region based on driving distances.

In an illustrative example, the worldwide baseline distance is 25 miles, the combining factor is 1.0 and the typical proximity distance for the region is 20 miles. Accordingly, the scaled typical proximity distance for the region is:

(1+1.0*25/20)/(1+1)=1.125

Accordingly, the region distance multiplier is 1.125. In some implementations, the bounds for the range, e.g., 0.5 and 2.0, and the combining factor, e.g., 1.0, are determined by iteratively changing them and empirically testing the results, e.g., comparing the corresponding rankings, and trying to mitigate extreme effects in rural or very dense areas, while still improving results in more typical circumstances.

The proximity distance score is a function of the distance from the search result location to the query location. Consider a particular search result example, where the distance from the search result location to the query location is 17 miles. The proximity distance can be adjusted by the region distance multiplier, such that the proximity distance score is a function of the distance (17*1.125) rather than a function of the distance (17). That is, the distance score (sometimes referred to as a distance penalty) in this example is calculated as if the distance between the search result location and the query location was actually 17×1.125=18.913 miles, i.e., a greater distance. This can mean that a search result that is 17 miles from the query location in a slightly dense region is treated the same as a search result that is 18.913 miles away in an ordinarily dense region, because in a slightly dense region, users are typically expecting to travel shorter distances. The distance function can be oblivious to the change in the proximity distance (i.e., from 17 miles to 18.913 miles). That is, the same distance function can be applied with the input adjusted by the region distance multiplier.

In some implementations, the distance importance factor for regions and queries can be stored separately, e.g., as independent tables, and combined or otherwise used together at query time. For example, the information in the query-data store 214 and the region-data store 216 can be used together at query time. In the above example, the region distance multiplier is an example of region-specific data that can be stored in the region-data store.

In some implementations, an overall distance score (sometimes referred to as a distance penalty) can be calculated based on both the region data and query data as follows. A "region influenced penalty" can be calculated based on a distance penalty function where the input to the function is adjusted by the region distance multiplier for the particular region. That is, Region Influenced Penalty=Distance Penalty (distance×region distance multiplier)

A "query and region influenced penalty" can be calculated based on a "query farness score" and the region influenced penalty (i.e., as calculated above). In a particular example, the query and region influenced penalty is determined as follows:

Query & Region Influenced Penalty=Query Farness Score+(1−Query Farness Score)×Region Influenced Penalty The query farness score can be calculated as a function of the typical region-normalized proximity distance for the query, for example, which can be calculated above using the process 600 described in reference to FIG. 6. In some implementations, the query farness score is given a low value at a low threshold value of the typical region-normalized proximity distance and a high value at a high threshold value of the typical region-normalized proximity distance, with a linear progression in between the low and high values. In a particular example, at a low threshold value of 0.8 of the typical regional-normalized proximity distance the query farness score is 0 and at a high threshold value of 1.8 the query farness score is 0.5. For extreme cases, e.g., for queries with very high typical region-normalized proximity distances and therefore high query farness scores (capped to the high value, e.g., 0.5), the output distance penalty function can be linearly remapped, e.g., from a domain of 0 to 1 to a domain of 0.5 to 1. This can have the effect of compressing the range of the distance penalty function, and therefore let other scoring factors (e.g., topicality and/or prominence) have more influence over the ranking. In particular, the linear remapping can allow very typical or prominent, yet far away (in terms of proximity distance) search results out-rank less topical or prominent yet nearby search results.

Figure 7A:
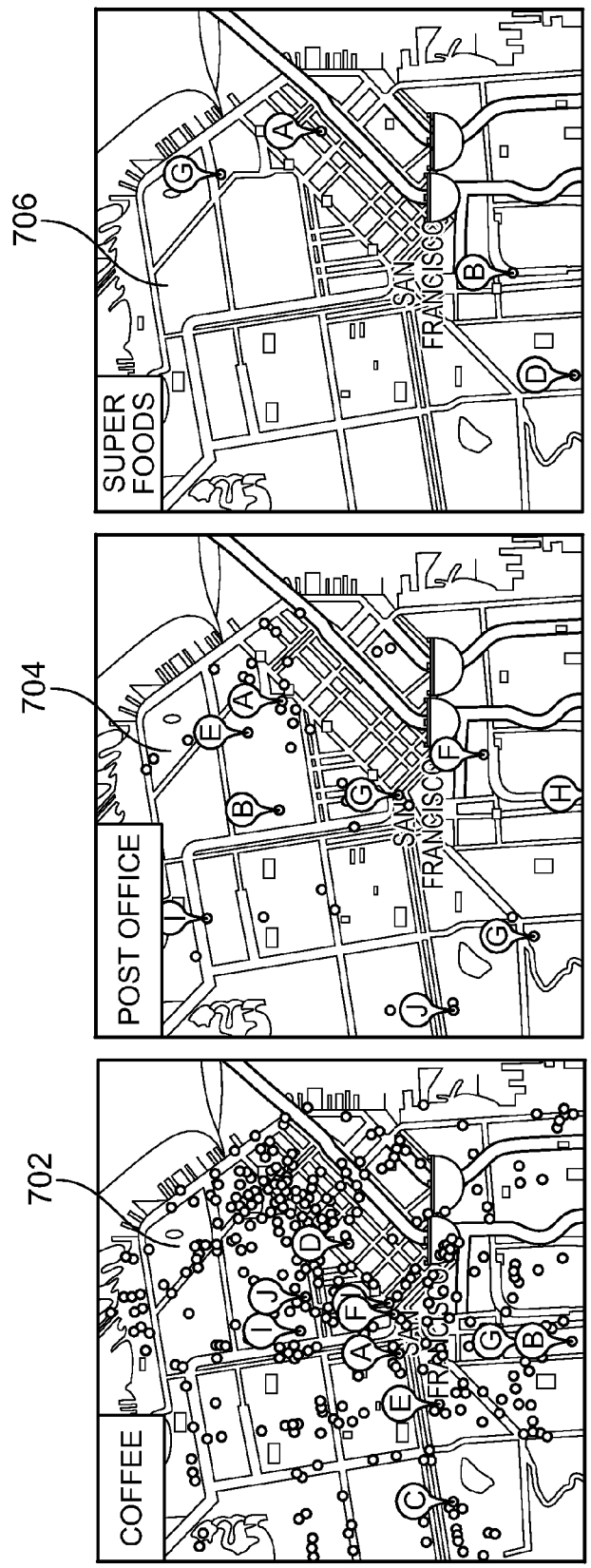
FIGS. 7A-C are schematic diagrams showing an example of calculating a distance importance factor.
Figure 7B:
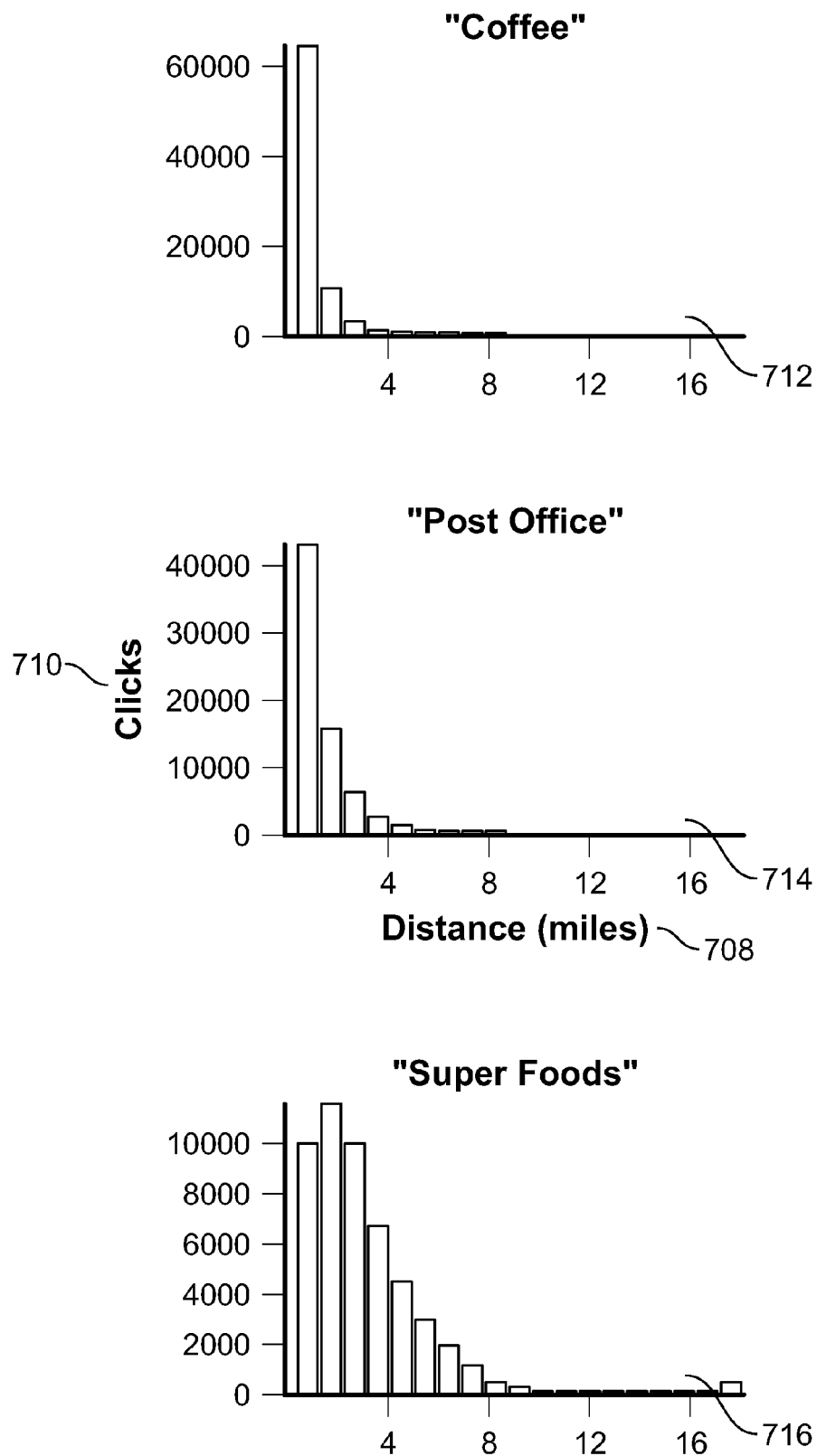
Figure 7C:
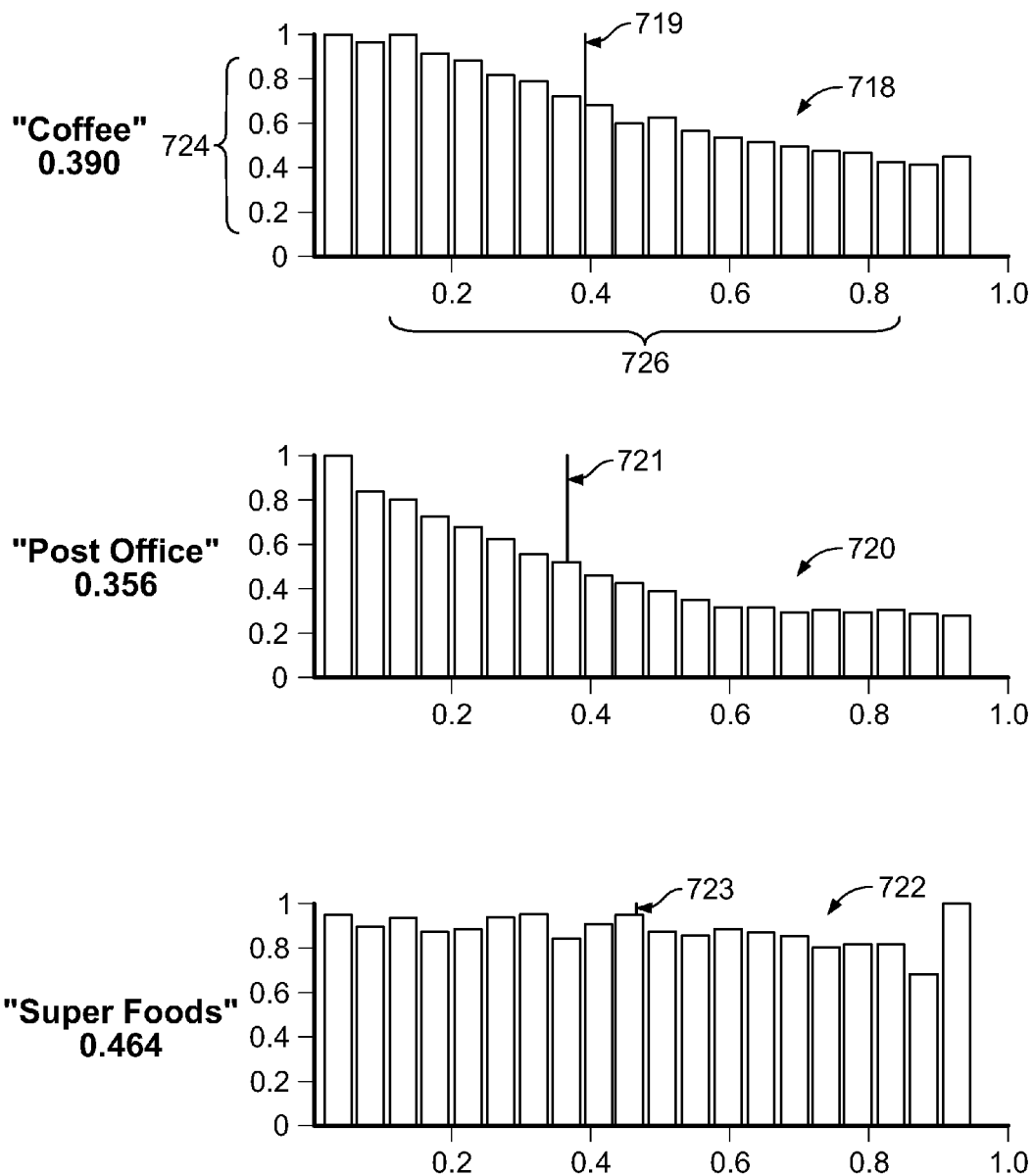

FIGS. 7A-C are schematic diagrams showing an example of calculating a distance importance factor. As described above, the distance importance factor can be calculated based on click data or driving/walking distance data or a combination of both. In FIG. 7A, a number of maps of searched venues are depicted. The specific search queries that prompted the mapped search results include "coffee," "post office," and "Super Foods," corresponding respectively to map 702, map 704, and map 706.

The map 702 can be generated if, for example, a user enters a search query for "coffee" in a search engine mapping application. The map 702 displays a first set of ranked search results A through J. In some implementations, the ranked search results are ranked with increasing distance from the user's search query location as the alphabet letters increment. Similarly, the map 704 can be generated if a user enters a search query for "post office" in a search engine mapping application. The map 704 displays a second set of ranked search results A through J. The map 706 can be generated if, for example, a user enters a search query for "Super Foods" in a search engine mapping application. The map 706 displays a third set of ranked search results A, B, D, and G.

The search queries for "coffee," "post office," and "Super Foods" can be entered by a number of users over time. The systems in this description can collect click data, driving direction data, query data, and/or user entered data to determine a distance importance factor for each query. In the examples shown, click data corresponding to the queries is used to determine distance importance factors for the queries.

In FIG. 7B, example click counts are graphed for each search query. The click counts can, for example, be translated into click through rates for further analysis. The click counts are graphed as clicks 710 against distance 708 in miles. In particular, the search query click counts for "coffee" are shown by graph 712; click counts for "post office" are shown by graph 714; and click counts for "Super Foods" are shown by graph 716.

The "coffee" graph 712 depicts a high number of clicks for coffee venue search results that correspond to a location that is in the range of 1-2 miles away from the query location. Similarly, the "post office" graph 714 depicts a high number of clicks for post office venues within 1-3 miles of query locations. This low tolerance for traveling far for coffee venues or post office venues can indicate the importance of proximity when ranking search results for these queries, i.e., users are typically interested in search result locations close to the query location. In some examples, the low tolerance for traveling farther from the query location may be a function of the density of coffee venues and/or post office venues in the region including the query location. The "Super Foods" graph 716 depicts high numbers of clicks from 1-8 miles, indicating that a user may be more tolerant to traveling farther for a "Super Foods" grocery store. That is, the importance of proximity when ranking search results for these queries is lower, and therefore search results can be penalized less for proximity.

As shown in FIG. 7C, the click counts of FIG. 7B have been calculated into a click through rate (CTR) for each query. In particular, graphs 718, 720, and 722 depict CTRs for the queries "coffee," "post office," and "Super Foods" shown on the vertical axis and the scaled and normalized distances shown on the horizontal axis. Because different types of businesses can be distributed more densely or sparsely, the proximity distance can be normalized based on the distances of returned search results for the query. For example, the normalized distance (ND) can be calculated as follows:

$$ND = \frac{[\text{Distance of Result} - \text{Distance of Closes Result}]}{[\text{Distance of Farthest Result} - \text{Distance of Closest Result}]}$$

The normalized distance can be distance to a value between 0 and 1, so that the distances shown on the horizontal axis are in the 0 to 1 range.

In FIG. 7C, the click through rate has been normalized as well. Typically, search results that are positioned higher in the list and prone to having a higher click through rate. The search result in the first position usually has the highest click through rate. As such, the click through rate for the search results can be normalized based on the average click through rate for a search result at the position. In one example, the "position score" for a search result at a particular position, k, in the search result list can be calculated as follows:

Position score (k)=(Total clicks across all positions)/
(Clicks at Position k)

The position normalized click through rate can then be calculated as follows:

$$\text{Position Normalized } CTR\ (k) = \frac{\sum_k \text{position\_score}(k) \times \text{clicks}(k)}{\sum_k \text{impressions}(k)}$$

In some implementations, other scaling and weighting schemes can be applied to CTRs. The above equations are illustrative examples.

The graph 718 depicts a median normalized CTR 719 of 0.390 for the search query "coffee. Similar calculations can be performed for the "post office" query and the "Super Foods" query to obtain respective median normalized CTR 721 of 0.356 and CTR 723 of 0.464. In some implementations, the median normalized CTR can be used as the distance importance factor in a scoring operation to score a search result for ranking. That is, the median normalized CTR can be used as the indication of importance of proximity to a search query. In other implementations, the mean normalized CTR can be used instead of the median.

In some implementations, when using click through rate to determine a distance importance factor, click data for certain queries can be rejected from consideration. For example, if a user pulls up a map in a mapping application of a town and inputs a search query for Laundromats. In response, the locations of Laundromats in the region depicted in the map are shown. However, if the user lives at an edge of the region (or anywhere that is not close to the center of the map as shown), then the user is more likely to click laundromats near his house, which are not proximate to the center of the map, which represents the query location. Accordingly, in some implementations, only queries with exact addresses are considered. For example, if the user had input his address to pull up the map, rather than the name of a town, then an example query location address is known.

Another example of query that may be disregarded is a navigational query. That is, if in a mapping application the user inputs the name of a specific business and a specific address, e.g., "Chumley's near 111 8$^{th}$ Ave, New York", a small number of search results will likely be presented. The user is likely trying to obtain a map that shows the address 111-8$^{th}$ Ave (which may be the user's address, for example) and the Chumley's so he can navigate to the location of Chumley's. For this type of query, distance is not a factor, since the user is going to select the Chumley's search result regardless of the search result location. Accordingly, only queries that return a number of search results exceeding a predetermined minimum, e.g., 10, can be considered. If the search results list is less than the minimum, the search query is likely a navigational query and is ignored.

In some implementations, for example if click data or driving distance data was not available, the distance importance factor can be determined based on population density data for a geographic region that includes the query location. The correlation of population density data to importance of proximity can be illustrated by the following example. In a high population density region like New York City, if a user is looking for post office, proximity is likely quite important because there are probably many post offices in New York City and the user wants the closer one to the query location. By contrast, if the user is in a small town in a rural area of Montana, there is likely only one post office in the town, so the proximity to the query location is less important to the user, i.e., the user just wants to know where to find the one post office. Therefore, in some implementations, population density data can be used to determine a distance importance factor that indicates the importance of proximity for search queries having a query location in a particular region.

In some implementations, the distance importance factor can be determined based on business density data for a particular type of business in a region. That is, in a region where a business of a particular type is of relatively high density, e.g., coffee shops in Seattle, the distance importance factor for a search query that relates to coffee shops may be higher than in a region where coffee shops are distributed more sparsely. In such an implementation, a typical representative proximity distance and/or the distance importance factor can be determined for queries that relate to businesses, where business density data is available, based on the business density. The typical representative proximity distance and/or distance importance factor for the query can be region specific, for example, to account for the varying business densities in different regions.

In some implementations, the search query is used to query a collection of business listings and/or points of interest listings. For example, the collection of business and point of interest listings can be provided by yellow page providers, business owners and/or from crawling web pages that describes a business or point of interest. Each business and point of interest included in the collection can be associated with one or more categories. The one or more categories to associate with the business or point of interest can come from the yellow page provider or business owner. Otherwise, available information, such as the business/point of interest name, reviews of the business/point of interest and/or content from web pages about the business/point of interest, can be used to categorize the business or point of interest. Once the businesses and points of interest in the collection have been categorized, the density of businesses or points of interest falling within a particular category can be determined. In some implementations, as mentioned, the density can be determined on a region basis. The same regions that were used above to determine a typical proximity distance on a region basis can be used to determine business/point of interest density, although different (i.e., larger or smaller) regions can be used as well. The density for each category for each region can be stored, for example, in a table.

When a search query is received, a category associated with the query is determined. In some implementations, typical search results for the query from a historical log of query and click data can be examined to determine the most common category associated with businesses or points of interest provided in response to the query in past. For example, if the search query is "Pizza" and in the past, 8 out of 10 of the search results were for businesses falling within the category of "Pizza Restaurant", then the category associated with the query is determined to be Pizza Restaurant. The density for the category of Pizza Restaurant can be retrieved from the store of category/density/region information, for the region that includes the query location for the search query. Based in the density of pizza restaurants in the region, a typical proximity distance and/or distance importance factor is determined. For example, in a region where pizza restaurant density is high, for example, in downtown Chicago, the distance importance factor will be higher than in a region where the pizza restaurant density is low, for example, in San Francisco's Chinatown. That is, in downtown Chicago, the user that input the search query is more likely to be looking for a closely proximate pizza restaurant than a user in Chinatown, who is expecting to have to travel a distance to reach a pizza restaurant destination. In some implementations, the distance importance factor can be stored in the table with the density information. In other implementations, the distance importance factor on a category/region basis can be determined based on the category density and stored in a table with the category and region, without storing the density information itself in the table. Other techniques can be used to categorize a business or point or interest, and/or to determine a category related to a search query, in addition to the illustrative techniques described here.

Figure 8:
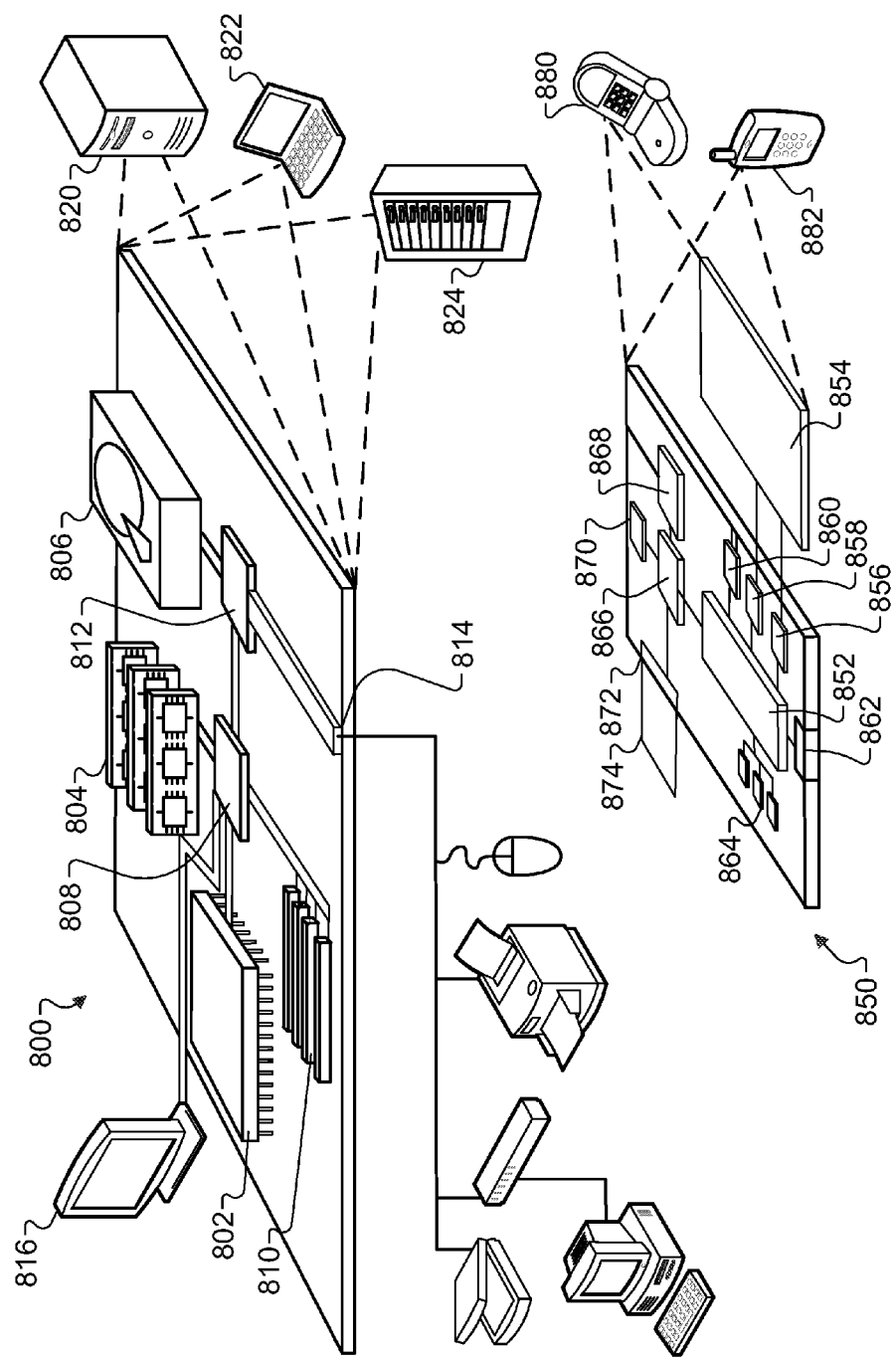
FIG. 8 shows examples of computer devices that may be used to execute the actions discussed in this document.

FIG. 8 shows an example of a computer 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various buses, and may be mounted on a common motherboard or in other manners as appropriate. The processor 802 may process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 may execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 may be implemented as one or more of a computer-readable medium or media, a volatile memory unit or units, or a non-volatile memory unit or units. Expansion memory 874 may also be provided and connected to device 850 through expansion interface 872, which may include, for instance, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Device 850 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 850 and used to update the display of the respective devices 850 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented system comprising:
   one or more computers;
   one or more data storage devices coupled to the one or more computers and storing instructions that, when executed by the one or more computers, cause the one or more computers to perform operations comprising:
      receiving query log data that includes a plurality of queries, and for each query one or more search results that were selected by users from a set of search results that were presented in response to the query;
      generating, based on the received query log data, a collection of queries and a result distance for each query in the collection of queries, where for a particular query the result distance is representative of a typical distance between locations associated with search results that were presented in response to the particular query and selected by users and a query location for the particular query; and
      generating, based on the received query log data, region data that identifies a plurality of geographic regions and data that associates each identified region with a region distance.

2. The system of claim 1, wherein the operations performed by the one or more computers further comprise, for at least one query, operations for generating the result distance from one or more driving direction distances associated with one or more selected search results presented in response to the at least one query, where a driving direction distance is a distance determined in response to receiving a driving direction request for the corresponding selected search result.

3. The system of claim 2, wherein the result distance for the at least one query is determined from the median of the one or more driving direction distances for the at least one query.

4. The system of claim 2, wherein the result distance for the at least one query comprises the mean of the one or more driving direction distances for the at least one query.

5. The system of claim 1, wherein the result distance for the particular query comprises the median of the distances between the locations for the one or more selected search results and the location for the particular query.

6. The system of claim 1, wherein the result distance for the particular query comprises the mean of the distances between the locations for the one or more selected search results and the location for the particular query.

7. The system of claim 1, wherein the result distance for a particular query comprises a scaled value between 0 and 1.

8. The system of claim 1, wherein for a particular region, the region distance is representative of a typical distance between the locations of queries having a query location within the particular region and the locations of respective search results that were presented in response to those queries and selected by users.

9. The system of claim 1, wherein the instructions, when executed by the one or more computers, cause the one or more computers to perform operations further comprising:
   generating a distance factor for each query in the collection of queries by dividing the result distance associated with each query by the region distance associated with the region that includes the query location.

10. A computer-implemented method comprising:
    receiving query log data that includes a plurality of queries, and for each query one or more search results that were selected by users from a set of search results that were presented in response to the query;
    generating, based on the received query log data, a collection of queries and a result distance for each query in the collection of queries, where for a particular query the result distance is representative of a typical distance between locations associated with search results that were presented in response to the particular query and selected by users and a query location for the particular query; and
    generating, based on the received query log data, region data that identifies a plurality of geographic regions and data that associates each identified region with a region distance.

11. The method of claim 10, further comprising for at least one query, generating the result distance from one or more driving direction distances associated with one or more selected search results presented in response to the at least one query, where a driving direction distance is a distance determined in response to receiving a driving direction request for the corresponding selected search result.

12. The method of claim 11, wherein the result distance for the at least one query is determined from the median of the one or more driving direction distances for the at least one query.

13. The method of claim 11, wherein the result distance for the at least one query comprises the mean of the one or more driving direction distances for the at least one query.

14. The method of claim 10, wherein the result distance for the particular query comprises the median of the distances between the locations for the one or more selected search results and the location for the particular query.

15. The method of claim 10, wherein the result distance for a particular query comprises the mean of the distances between the locations for the one or more selected search results and the location for the particular query.

16. The method of claim 10, wherein for a particular region, the region distance is representative of a typical distance between the locations of queries having a query location within the particular region and the locations of respective search results that were presented in response to those queries and selected by users.

17. The method of claim 10, further comprising:
    generating a distance factor for each query in the collection of queries by dividing the result distance associated with each query by the region distance associated with the region that includes the query location.

18. A computer-readable medium encoded with instructions which, when executed by one or more computers, cause the one or more computers to perform operations comprising:
  receiving query log data that includes a plurality of queries, and for each query one or more selected search results that were selected from a set of search results generated in response to the query;
  generating, based on the received query log data, a collection of queries and stored data that associates each query with a result distance, where for a particular query the result distance is representative of a typical distance between selected search result locations associated with search results that were selected from the set of search results generated in response to the particular query and a query location for the particular query, each search result location being a geographic location associated with a search result and the query location being a geographic location associated with the particular query; and
  generating, based on the received query log data, region data that identifies a plurality of geographic regions and data that associates each identified region with a region distance, where for a particular region the region distance is representative of a typical distance between geographic locations associated with search results that were selected in response to being provided for one or more search queries having a query location within the geographic region and query locations within the particular geographic region.

19. The computer-readable medium of claim 18, wherein the query log data further comprises for each query one or more driving direction distances associated with the one or more selected search results for the query, where a driving direction distance is a distance determined in response to receiving a driving direction request for the corresponding selected search result, where the operations further comprise:
  determining the result distance to associate with each query based on the one or more driving direction distances for the particular query.

20. The computer-readable medium of claim 19, wherein the result distance for a particular query is determined from the median of the one or more driving direction distances for the particular query.

21. The computer-readable medium of claim 19, wherein the result distance for a particular query comprises the mean of the one or more driving direction distances for the particular query.

22. The computer-readable medium of claim 18, wherein the result distance for a particular query comprises the median of the distances between the search result locations and the query locations for the one or more selected search results for the particular query.

23. The computer-readable medium of claim 18, wherein the result distance for a particular query comprises the mean of the distances between the search result locations and the query locations for the one or more selected search results for the particular query.

24. The computer-readable medium of claim 18, the operations further comprising:
  generating data that associates each query in the collection of queries with a region-normalized distance that is the result distance associated with the query adjusted based on a geographic region that includes the query location.

* * * * *